United States Patent
Jozef Klinkenberg et al.

(10) Patent No.: US 7,897,662 B2
(45) Date of Patent: Mar. 1, 2011

(54) TIRE WITH COMPONENT CONTAINING CELLULOSE

(75) Inventors: Maurice Peter Catharina Jozef Klinkenberg, Vichten (LU); Georges Marcel Victor Thielen, Schouweiler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 576 days.

(21) Appl. No.: 11/858,335

(22) Filed: Sep. 20, 2007

(65) Prior Publication Data

US 2009/0082511 A1    Mar. 26, 2009

(51) Int. Cl.
*C08G 18/38*    (2006.01)
*C09G 1/10*     (2006.01)

(52) U.S. Cl. .......................... 524/35; 524/77
(58) Field of Classification Search .......... 524/35, 524/77
See application file for complete search history.

(56) References Cited

U.S. PATENT DOCUMENTS

| | | | |
|---|---|---|---|
| 3,697,364 A | 10/1972 | Boustany et al. | 161/59 |
| 3,709,845 A | 1/1973 | Boustany et al. | 260/17.4 |
| 3,802,478 A | 4/1974 | Boustany et al. | 152/357 |
| 4,243,769 A | 1/1981 | Pritchett | 525/222 |
| 4,659,754 A | 4/1987 | Edwards et al. | 523/214 |
| 5,151,142 A | 9/1992 | Imai et al. | 152/565 |
| 5,852,079 A | 12/1998 | Loreth | 524/35 |
| 5,967,211 A * | 10/1999 | Lucas et al. | 152/209.4 |
| 2003/0191224 A1 * | 10/2003 | Maruyama et al. | 524/445 |
| 2004/0024093 A1 | 2/2004 | Weydert et al. | 524/47 |
| 2006/0167160 A1 | 7/2006 | Nakagawa et al. | 524/442 |

FOREIGN PATENT DOCUMENTS

| | | |
|---|---|---|
| EP | 0332459 A1 | 3/1989 |
| EP | 0905186 A1 | 3/1999 |
| KR | 2002 0092505 A | 12/2002 |
| KR | 100 642055 B1 | 11/2006 |

OTHER PUBLICATIONS

European Search Report Completed Feb. 9, 2009.
Product Data Sheet, Sartomer Company, Inc., Ricon® 131 Maleinized Polybutadiene, Aug. 2004.
Data sheet, J. Rettenmaier & Sohne GmbH & Co., Arbocel® Highly Pure Cellulose, CAS-Nr.:9004-34-6, Mar. 2006.

* cited by examiner

*Primary Examiner*—William K Cheung
(74) *Attorney, Agent, or Firm*—John D. DeLong

(57) ABSTRACT

A pneumatic tire comprising at least one component, the at least one component comprising a rubber composition comprising the rubber composition comprising a diene based elastomer, from 1 to 30 parts by weight per 100 parts by weight of diene based elastomer (phr) of cellulose fiber, and from 1 to 20 phr of a substituted polyisoprene comprising units of formula I, wherein —R comprises hydrogen and a substituent group of structure II

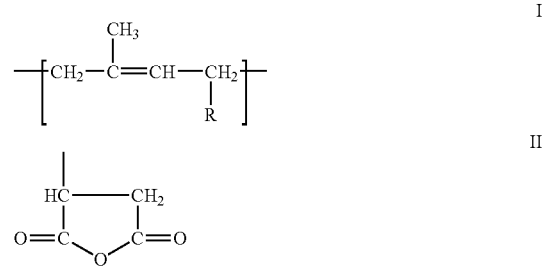

wherein the number of substituent groups of structure II occurring per substituted polyisoprene molecule ranges from 1 to 5, and the weight average molecular weight of the substituted polyisoprene ranges from 20000 to 30000.

10 Claims, 2 Drawing Sheets

TIRE WITH COMPONENT CONTAINING CELLULOSE

BACKGROUND OF THE INVENTION

In an effort to include renewable resources as components in tires, naturally occurring organic materials have previously been used as fillers in tire rubber compositions. However, compatibility between the organic fillers and rubber is generally poor, leading to low filler loading due to poor filler dispersion and poor adhesion between the rubber and the filler. There is therefore a need for improved rubber compositions containing naturally occurring organic fillers.

SUMMARY OF THE INVENTION

The present invention is directed to a pneumatic tire comprising at least one component, the at least one component comprising a rubber composition, the rubber composition comprising a diene based elastomer, from 1 to 30 phr of cellulose, and from 1 to 20 phr of a substituted polyisoprene having a molecular weight ranging from 20000 to 30000.

DETAILED DESCRIPTION OF THE INVENTION

Figure 1:
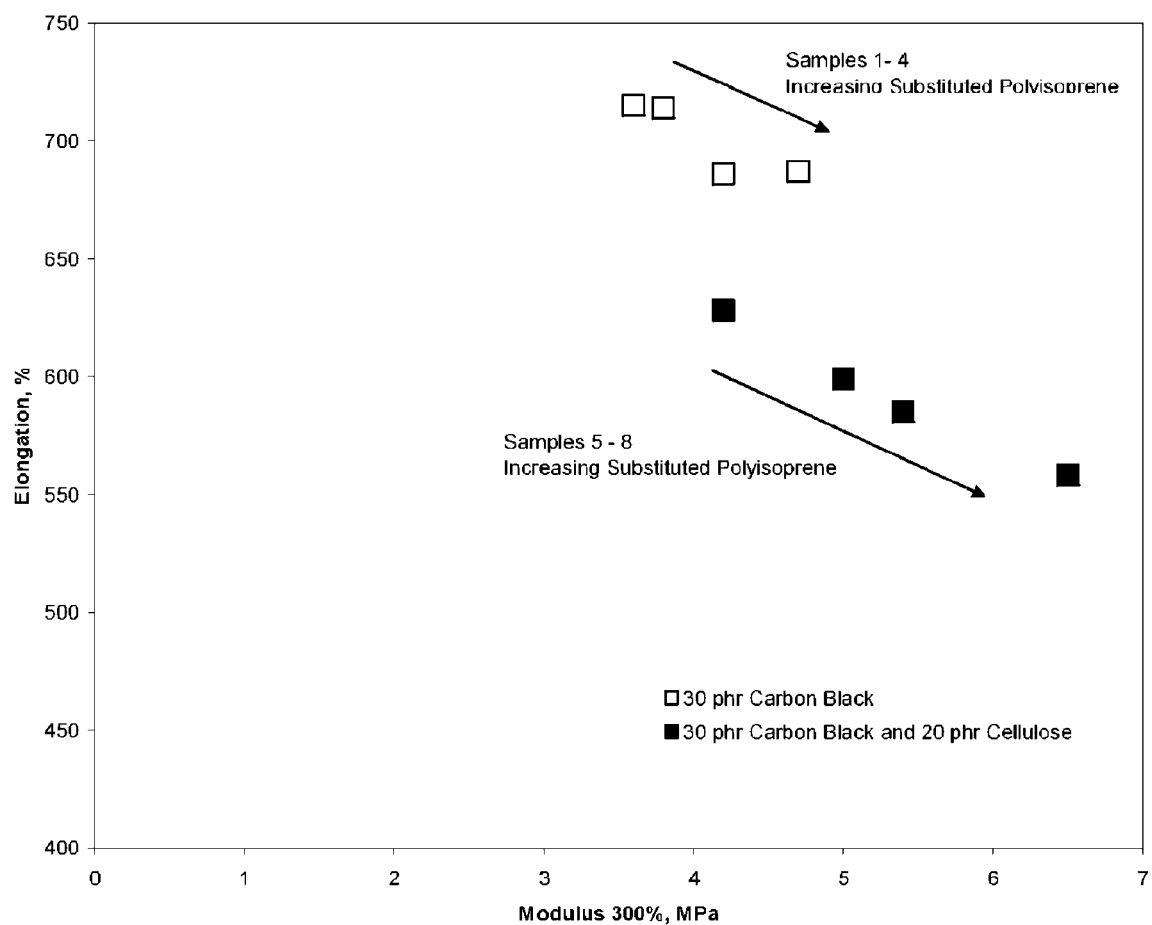
FIG. 1 shows a graph of elongation at break versus modulus at 300 percent elongation for Samples 1-8.

There is disclosed a pneumatic tire comprising at least one component, the at least one component comprising a rubber composition, the rubber composition comprising a diene based elastomer, from 1 to 30 phr of cellulose, and from 1 to 20 phr of a substituted polyisoprene having a molecular weight ranging from 20000 to 30000.

In one embodiment, the pneumatic tire of the present invention contains a rubber composition comprising a substituted polyisoprene comprising units of formula I, wherein —R comprises hydrogen and a substituent group of structure II, wherein the number of substituent groups of structure II occurring per substituted polyisoprene molecule ranges from 1 to 5, and the weight average molecular weight of the substituted polyisoprene ranges from 20000 to 30000.

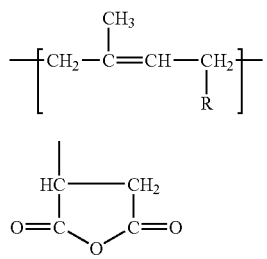

In one embodiment, —R comprises hydrogen and a substituent group of formula II, wherein the number of substituent groups of structure II occurring per substituted polyisoprene molecule ranges from 2 to 4, and the weight average molecular weight of the substituted polyisoprene ranges from 23,000 to 27,000.

Suitable substituted polyisoprene is available commercially from Kuraray as LIR-403, reportedly having an average of 3 substituent groups of structure II occurring per substituted polyisoprene molecule and an average molecular weight of about 25,000.

In one embodiment, the substituted polyisoprene is present in the rubber composition in a concentration ranging from 1 to 20 parts by weight per 100 parts by weight of diene based elastomer (phr). In another embodiment, the substituted polyisoprene is present in the rubber composition in a concentration ranging from 5 to 15 parts by weight per 100 parts by weight of diene based elastomer (phr).

The rubber composition also includes a cellulose fiber. By cellulose fiber, it is meant that the cellulose therein is substantially free of lignin. As described herein, the term "cellulose fiber" is intended to exclude those cellulosic materials containing substantial amounts of lignin, such as wood fiber. In one embodiment, the cellulose fiber is from 95 to 99.5 percent cellulose. In one embodiment, the cellulose fiber has an average length of from 15 to 25 microns. In one embodiment, the cellulose fiber has an average length of from 15 to 20 microns. In one embodiment, the cellulose fiber has an average thickness of from 10 to 20 microns. In one embodiment, the cellulose fiber has an average thickness of from 12 to 18 microns. Suitable cellulose fiber is available commercially from J. Rettenmaier & Söhne GmbH as Arbocel® BE 600-10 TG.

In one embodiment, the cellulose fiber is present in the rubber composition in a concentration ranging from 1 to 30 parts by weight per 100 parts by weight of diene based elastomer (phr). In another embodiment, the cellulose fiber is present in the rubber composition in a concentration ranging from 5 to 25 parts by weight per 100 parts by weight of diene based elastomer (phr). In another embodiment, the cellulose fiber is present in the rubber composition in a concentration ranging from 10 to 20 parts by weight per 100 parts by weight of diene based elastomer (phr).

The rubber composition may be used with rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the rubber is preferably of at least two of diene based rubbers. For example, a combination of two or more rubbers is preferred such as c is 1,4-polyisoprene rubber (natural or synthetic, although natural is preferred), 3,4-polyisoprene rubber, styrene/isoprene/butadiene rubber, emulsion and solution polymerization derived styrene/butadiene rubbers, c is 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, c is 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The c is 1,4-polyisoprene and c is 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts*, 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165 MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

$$Z-Alk-S_n-Alk-Z \qquad III$$

in which Z is selected from the group consisting of

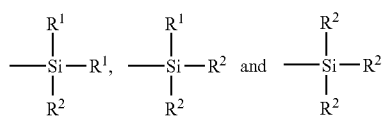

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxysilylpropyl) polysulfides. In one embodiment, the sulfur containing organosilicon compounds are 3,3'-bis(triethoxysilylpropyl) disulfide and/or 3,3'-bis(triethoxysilylpropyl)tetrasulfide. Therefore, as to formula III, Z may be

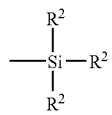

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting example.

Example 1

In this example, the effect of adding a substituted polyisoprene to a rubber composition containing cellulose according to the present invention is illustrated. Rubber compositions containing diene based elastomer, fillers, process aids, anti-degradants, and curatives were prepared following recipes as shown in Table 1, with all amounts given in parts by weight per 100 parts by weight of base elastomer (phr). Samples 1 through 4 contained carbon black but no cellulose and served as controls. Samples 5 through 7 included carbon black and cellulose and are representative of the present invention. The amount of substituted polyisoprene was varied from 0 to 15 phr; a polyisoprene homopolymer of a molecular weight similar to the substituted polyisoprene was used to maintain the total concentration of (substituted polyisoprene+polyisoprene homopolymer) constant at 15 phr.

The samples were tested for viscoelastic properties using RPA. "RPA" refers to a Rubber Process Analyzer as RPA 2000™ instrument by Alpha Technologies, formerly the Flexsys Company and formerly the Monsanto Company. References to an RPA 2000 instrument may be found in the following publications: H. A. Palowski, et al, *Rubber World*, June 1992 and January 1997, as well as *Rubber & Plastics News*, April 26 and May 10, 1993.

The "RPA" test results in Table 2 are reported as being from data obtained at 100° C. in a dynamic shear mode at a frequency of 1 hertz and at the reported dynamic strain values. Tensile and hardness properties were also measured and reported in Table 3.

TABLE 1

| | |
|---|---|
| Natural Rubber | 100 |
| Carbon Black | variable as per Table 2 |
| Cellulose[1] | variable as per Table 2 |
| Antidegradant | 1 |
| Zinc Oxide | 2.5 |
| Stearic Acid | 2 |
| Sulfur | 1.6 |
| Accelerator | 1.2 |
| Liquid polyisoprene[2] | variable as per Table 2 |
| Substituted polyisoprene[3] | variable as per Table 2 |

[1]Arbocel BE 600-10 TG, from J. Rettenmaier & Söhne GmbH + Co.
[2]LIR-30, polyisoprene homopolymer with molecular weight of 29,000; from Kuraray.
[3]LIR-403, substituted polyisoprene with 3 groups of structure II per molecule and molecular weight of 25,000; from Kuraray.

TABLE 2

| | Type | | | | | | | |
|---|---|---|---|---|---|---|---|---|
| | control | | | | inventive | | | |
| | Sample No. | | | | | | | |
| | 1 | 2 | 3 | 4 | 5 | 6 | 7 | 8 |
| Carbon Black | 30 | 30 | 30 | 30 | 30 | 30 | 30 | 30 |
| Cellulose | 0 | 0 | 0 | 0 | 20 | 20 | 20 | 20 |
| Liquid polyisoprene[1] | 15 | 10 | 5 | 0 | 15 | 10 | 5 | 0 |
| Substituted polyisoprene[2] | 0 | 5 | 10 | 15 | 0 | 5 | 10 | 15 |

[1]LIR-30, polyisoprene homopolymer with molecular weight of 29,000; from Kuraray.
[2]LIR-403, substituted polyisoprene with 3 groups of structure II per molecule and molecular weight of 25,000; from Kuraray.

TABLE 3

| | Sample No. | | | | | | | |
|---|---|---|---|---|---|---|---|---|
| | 1 | 2 | 3 | 4 | 5 | 6 | 7 | 8 |
| RPA, 100° C., 1 Hz | | | | | | | | |
| G', 1% strain (MPa) | 0.61 | 0.66 | 0.67 | 0.67 | 0.72 | 0.81 | 0.82 | 0.79 |
| G', 10% strain (MPa) | 0.56 | 0.6 | 0.62 | 0.62 | 0.66 | 0.72 | 0.73 | 0.73 |
| G', 50% strain (MPa) | 0.50 | 0.52 | 0.54 | 0.55 | 0.57 | 0.61 | 0.63 | 0.65 |
| tan delta, 10% strain | 0.037 | 0.046 | 0.045 | 0.044 | 0.036 | 0.049 | 0.05 | 0.047 |
| Shore A Hardness 23° C. | 43 | 44 | 45 | 48 | 49 | 51 | 52 | 53 |
| Ring Modulus, 23° C. | | | | | | | | |
| Elongation at break, % | 715 | 714 | 686 | 687 | 628 | 599 | 585 | 558 |
| Modulus 100%, MPa | 0.9 | 1 | 1.1 | 1.2 | 1.3 | 1.6 | 1.7 | 2 |
| Modulus 300%, MPa | 3.6 | 3.8 | 4.2 | 4.7 | 4.2 | 5 | 5.4 | 6.5 |
| Tensile Strength, MPa | 19.6 | 20.3 | 20.2 | 21.2 | 15.4 | 15.4 | 15.6 | 15.9 |

Example 2

In this example, the effect of adding a substituted polybutadiene having a molecular weight of 5600 and 11 substituent groups per molecule to a rubber composition containing cellulose in comparison to the present invention is illustrated. Rubber compositions containing diene based elastomer, fillers, process aids, antidegradants, and curatives were prepared following recipes as shown in Table 4, with all amounts given in parts by weight per 100 parts by weight of base elastomer (phr). Samples 9 through 16 served as comparative samples; Samples 9 through 12 contained carbon black but no cellulose, and Samples 13 through 16 included carbon black and cellulose. The amount of substituted polybutadiene was varied from 0 to 15 phr; a polybutadiene homopolymer of a molecular weight similar to the substituted polyisoprene was used to maintain the total concentration of (substituted polybutadiene+polybutadiene homopolymer) constant at 15 phr. Samples were tested for viscoelastic and physical properties as described in Example 1, with results given in Tables 5 and 6.

TABLE 4

| | |
|---|---|
| Natural Rubber | 100 |
| Carbon Black | variable as per Table 2 |
| Cellulose[1] | variable as per Table 2 |
| Antidegradant | 1 |
| Zinc Oxide | 2.5 |
| Stearic Acid | 2 |
| Sulfur | 1.6 |
| Accelerator | 1.2 |
| Liquid polyisoprene[2] | variable as per Table 2 |
| Substituted polyisoprene[3] | variable as per Table 2 |

[1]Arbocel BE 600-10 TG, from J. Rettenmaier & Söhne GmbH + Co.
[2]R131, polybutadiene homopolymer with molecular weight of 4500, from Sartomer.
[3]R131MA20, substituted polybutadiene with molecular weight of 5600 and 11 substituent groups according to structure II per molecule, from Sartomer.

TABLE 5

| | Type Comparative Sample No. | | | | | | | |
|---|---|---|---|---|---|---|---|---|
| | 9 | 10 | 11 | 12 | 13 | 14 | 15 | 16 |
| Carbon Black | 30 | 30 | 30 | 30 | 30 | 30 | 30 | 30 |
| Cellulose | 0 | 0 | 0 | 0 | 20 | 20 | 20 | 20 |
| Liquid polybutadiene[1] | 15 | 10 | 5 | 0 | 15 | 10 | 5 | 0 |
| Substituted polybutadiene[2] | 0 | 5 | 10 | 15 | 0 | 5 | 10 | 15 |

[1]R131, polybutadiene homopolymer with molecular weight of 4500, from Sartomer.
[2]R131MA20, substituted polybutadiene with molecular weight of 7500 and 11 substituent groups according to structure II per molecule, from Sartomer.

BRIEF DESCRIPTION OF THE DRAWINGS

Figure 2:
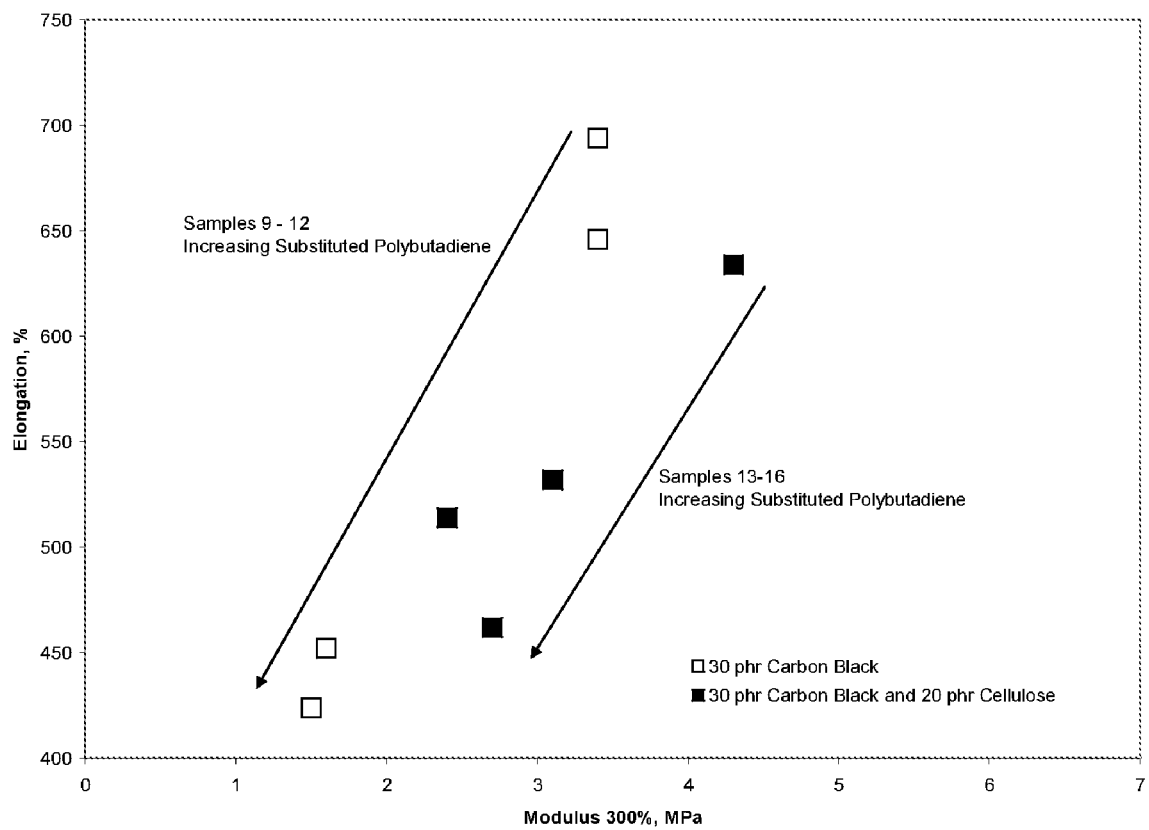
FIG. 2 shows a graph of elongation at break versus modulus at 300 percent elongation for Samples 9-16.

With reference now to FIGS. 1 and 2, the elongation at break is plotted versus the modulus at 300 percent elongation for each of Samples 1 through 8 (FIG. 1) and Samples 9 through 16 (FIG. 2).

As seen in FIG. 1, Samples 5 through 8 containing cellulose showed a significant increase in modulus with increasing concentration of substituted polyisoprene, as compared with Samples 1 through 4 containing no cellulose. While not wishing to be bound by any theory, it is believed that the increase in modulus indicates a significant interaction between the cellulose, substituted polyisoprene, and base elastomer. Samples 1 through 4 showed some increase in modulus, indicating some interaction between the carbon black and substituted polyisoprene, but considerably less so than for the cellulose-containing Samples 5 through 8. Surprisingly and unexpectedly, the modulus increases by more than 55 percent with increasing substituted polyisoprene for samples with cellulose (Sample 8 vs Sample 5), compared to an increase of only 30 percent for samples with carbon black (Sample 4 vs Sample 1).

By contrast and as seen in FIG. 2, comparative Samples 9 through 12 containing carbon black, and comparative Samples 13 through 16 containing carbon black and cellulose surprisingly and unexpectedly showed an actual decrease in modulus with increasing substituted polybutadiene. While not wishing to be bound by any theory, it is believed that the higher number of substituted groups per molecule in the substituted polybutadiene additive interfered with the interaction of the additive with the remainder of the rubber composition as shown in FIG. 2, in contrast to the behavior shown in FIG. 1.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising at least one component, the at least one component comprising a rubber composition comprising the rubber composition comprising a diene based elastomer, from 1 to 30 parts by weight per 100 parts by weight of diene based elastomer (phr) of cellulose fiber, and from 1 to 20 phr of a substituted polyisoprene comprising units of formula I, wherein —R comprises hydrogen and a substituent group of structure II

TABLE 6

| | Sample No. | | | | | | | |
|---|---|---|---|---|---|---|---|---|
| | 9 | 10 | 11 | 12 | 13 | 14 | 15 | 16 |
| RPA, 100° C., 1 Hz | | | | | | | | |
| G', 1% strain (MPa) | 0.56 | 0.52 | 0.38 | 0.37 | 0.66 | 0.52 | 0.45 | 0.45 |
| G', 10% strain (MPa) | 0.52 | 0.5 | 0.35 | 0.34 | 0.6 | 0.47 | 0.39 | 0.39 |
| G', 50% strain (MPa) | 0.46 | 0.44 | 0.27 | 0.27 | 0.51 | 0.37 | 0.27 | 0.28 |
| tan delta, 10% strain | 0.033 | 0.053 | 0.22 | 0.242 | 0.047 | 0.13 | 0.259 | 0.28 |
| Shore A Hardness 23° C. | 41 | 39 | 31 | 34 | 45 | 40 | 38 | 42 |
| Ring Modulus, 23° C. | | | | | | | | |
| Elongation at break, % | 694 | 646 | 424 | 452 | 634 | 532 | 514 | 462 |
| Modulus 100%, MPa | 0.8 | 0.8 | 0.5 | 0.6 | 1.2 | 0.8 | 0.7 | 0.8 |
| Modulus 300%, MPa | 3.4 | 3.4 | 1.5 | 1.6 | 4.3 | 3.1 | 2.4 | 2.7 |
| Tensile Strength, MPa | 17.8 | 13.9 | 2.4 | 2.9 | 15.5 | 7.2 | 4.7 | 4.3 |

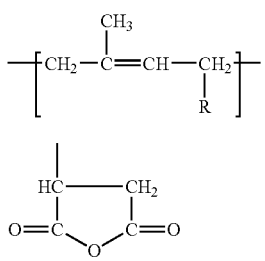

wherein the number of substituent groups of structure II occurring per substituted polyisoprene molecule ranges from 1 to 5, and the weight average molecular weight of the substituted polyisoprene ranges from 20000 to 30000.

2. The pneumatic tire of claim 1, wherein the number of substituent groups of structure II occurring per substituted polyisoprene molecule ranges from 2 to 4, and the weight average molecular weight of the substituted polyisoprene ranges from 23,000 to 27,000.

3. The pneumatic tire of claim 1, wherein the substituted polyisoprene is present in the rubber composition in a concentration ranging from 5 to 15 phr.

4. The pneumatic tire of claim 1, wherein the cellulose fiber is present in the rubber composition in a concentration ranging from 5 to 25 parts by weight per 100 parts by weight of diene based elastomer (phr).

5. The pneumatic tire of claim 1, wherein the cellulose fiber has an average length of from 15 to 25 microns.

6. The pneumatic tire of claim 1, wherein the cellulose fiber is from 95 to 99.5 percent by weight cellulose.

7. The pneumatic tire of claim 1, wherein the cellulose fiber has an average length of from 15 to 20 microns.

8. The pneumatic tire of claim 1, wherein the diene based elastomer is selected from the group consisting of natural rubber, synthetic polyisoprene rubber, polybutadiene rubber, and styrene-butadiene rubber.

9. The pneumatic tire of claim 1, wherein the rubber composition further comprises from 20 to 80 phr of carbon black.

10. The pneumatic tire of claim 1, wherein the rubber composition further comprises from 20 to 80 phr of silica.

* * * * *